United States Patent [19]

Allgäuer et al.

[11] Patent Number: 4,821,797
[45] Date of Patent: Apr. 18, 1989

[54] FLUID COOLER

[75] Inventors: Hans Allgäuer, Gisingen; Harald Kremnitz, Bludenz; Martin Obersberger, Thüringen, all of Austria

[73] Assignee: Norsk Hydro a.s., Oslo, Norway

[21] Appl. No.: 175,408

[22] Filed: Mar. 28, 1988

Related U.S. Application Data

[62] Division of Ser. No. 907,682, Sep. 15, 1986, Pat. No. 4,778,002.

[30] Foreign Application Priority Data

Sep. 14, 1985 [DE] Fed. Rep. of Germany ....... 3532930
Feb. 19, 1986 [DE] Fed. Rep. of Germany ....... 3605244

[51] Int. Cl.$^4$ ............................................. F28D 7/10
[52] U.S. Cl. ................................. 165/141; 165/154; 165/179
[58] Field of Search ............... 165/141, 154, 179, 181, 165/DIG. 916

[56] References Cited

U.S. PATENT DOCUMENTS

| 813,918 | 2/1906 | Schmitz | 165/141 |
|---|---|---|---|
| 2,960,114 | 11/1960 | Hinde | 165/179 |
| 4,094,358 | 6/1978 | Neveux | 165/154 |
| 4,345,644 | 8/1982 | Dankowski | 165/154 |
| 4,372,374 | 2/1983 | Lee | 165/154 X |
| 4,475,584 | 10/1984 | Martin et al. | 165/154 X |

FOREIGN PATENT DOCUMENTS

| 362995 | 2/1906 | France . |
| 1274618 | 9/1960 | France . |
| 1377458 | 9/1963 | France . |
| 2306421 | 10/1976 | France . |
| 2085574 | 4/1982 | United Kingdom . |

OTHER PUBLICATIONS

Patent Abstracts of Japan, vol. 7, No. 20 (M-188)[1165], Jan. 26, 1983.
U.S. Ser. No. 841,116, filed 3/3/86, Allgäuer et al.

Primary Examiner—Margaret A. Focarino
Attorney, Agent, or Firm—Wenderoth, Lind & Ponack

[57] ABSTRACT

A fluid cooler includes an inner shell concentrically mounted within the outer shell, both shells having corresponding circumferential contours. Radially extending heat exchange fins are provided at least on the outer surface of the inner shell and on the inner surface of the outer shell and have a inner surface of the outer shell having a height equal to half of the difference between the inner diameter of the outer and the outer diameter of the inner shells.

6 Claims, 5 Drawing Sheets

FLUID COOLER

This is a division of application Ser. No. 907,682, filed Sept. 15, 1986, now U.S. Pat. No. 4,778,002.

BACKGROUND OF THE INVENTION

1. Field of the Invention

The invention relates to a cooler, e.g. an oil cooler, composed of extruded shapes comprising a circumferentially closed inner core concentrically mounted within an outer circumferentially closed shell.

2. Description of the Prior Art

A cooler of this type is disclosed in U.S. Pat. No. 4,345,644. The inner and the outer shells in this cooler are provided as concentric walls in a one-piece coextruded shape where an annular passage formed between the shells is divided into individual passageways or chambers by partitions extending radially from the shells. The open front ends are closed by circular caps provided with inlet and outlet apertures for the cooling medium. These caps are attached to the extruded shape by a plurality of screws. Manufacture of an extrusion die to provide such a shape is a difficult task. Furthermore, the ratio between the passageway cross-section and its perimeter is unfavourable. This ratio decides the cooling capacity or performance of the cooler. Another parameter having quite important influence on the cooling capacity is the thickness of the medium layer between the two adjacent limiting surfaces of the cooler. Extensive tests show that the capacity increases substantially when this layer thickness is within double the value of the friction or boundary layer thickness of the cooling medium. The boundary layer is defined as a flow layer of a gaseous or liquid medium formed along a fixed wall in its vicinity and where the flow velocity increases from zero asymptotic to the velocity of the outer flow. The boundary layer thickness is then the distance from the wall when the flow velocity achieved is approximately 99% of the outer velocity. These values are known for liquid and gas media. For air and water these values represent about two millimeters, for oil (machine oils) the value can reach up to 6 millimeters. It is therefore important for an efficient cooler that the distance between the cooling surfaces is relatively small. On the other hand the cooler construction must be designed in such a way that the cooler, while complying with the above mentioned criteria, is also adaptable to different flow rates without changing the optimal flow velocity of the media which likewise represents a factor influencing the cooling capacity.

OBJECT OF THE INVENTION

The object of the invention is to provide a fluid cooler with improved specific cooling capacity and with more favourable ratio of flow between the cross-section of the passageway to its perimeter, and furthermore to provide such design conditions that the manufacture and the assembly of such cooler are simplified.

BRIEF DESCRIPTION OF THE INVENTION

The solution to this complex task is realized according to the present invention by the provision of a cooler comprising a circumferentially closed inner shell concentrically mounted within an outer circumferentially closed shell, where the inner shell at least on its outer surface and the outer shell at least on its inner surface are provided with radially and axially extending heat exchange fins and where the two shells have corresponding circumferential contours. The height of the fins measured in the radial direction is substantially equal to half the difference between the inner diameter of the outer shell and the outer diameter of the inner shell. The outwardly extending fins of the inner shell bisect passageways formed between two adjacent fins extending inwardly from the outer shell. The number of such passageways is equal to the number of the outwardly extending fins of the inner shell. In a more specific embodiment of the invention the outer shell and the inner shell can be mutually corrugated so that enlarged or compressed front end zones of the shells are engaged with each other in a tooth-like manner during assembly, thus avoiding the possibility of relative movement therebetween during soldering or welding thereof to form end joints. In this simple way it is possible to position the shapes and to ensure that the outwardly extending fins of the inner shell are positioned correctly in the passageways formed by the inwardly extending fins of the outer shell and bisect these passageways so that identical geometrical conditions are established over the entire cooler body.

BRIEF DESCRIPTION OF THE DRAWINGS

The invention will be explained in more detail referring to two embodiments shown in the accompanying drawings, wherein.

DESCRIPTION OF THE PREFERRED EMBODIMENTS

Figure 1:
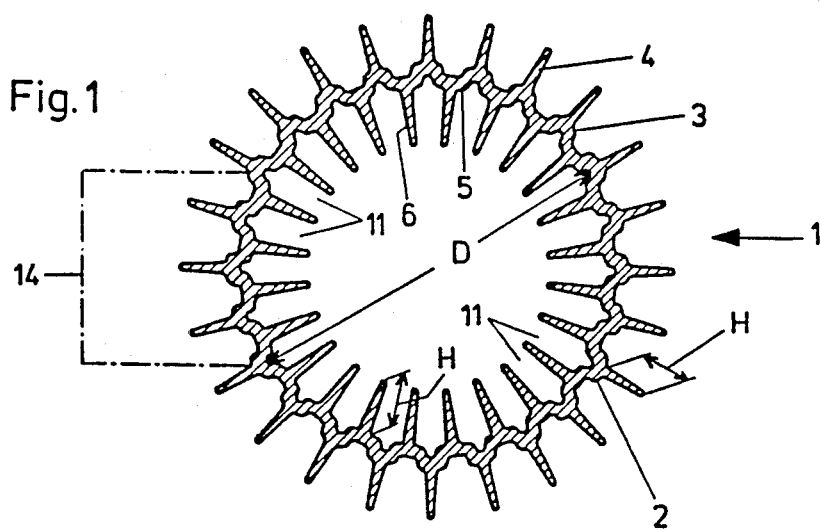
FIG. 1 is a cross section of an outer tube.

FIG. 1 illustrates a transverse cross section of an extruded outer tube 1 including an actual corrugated shell 2 having a plurality of axial corrugations, defining outward projections or tops 3 having integral outwardly extending heat exchange fins and inward projections or recesses having integral inwardly extending heat exchange fins 6. The corrugation tops 3 and recesses 5 extend parallel to the longitudinal axis of the outer tube 1. The wall thickness of the shell 2 as well as the thickness of the fins 4 and 6 is very small so that many fins are provided per length unit of the shell perimeter and so that the fin density is also high.

Figure 2:
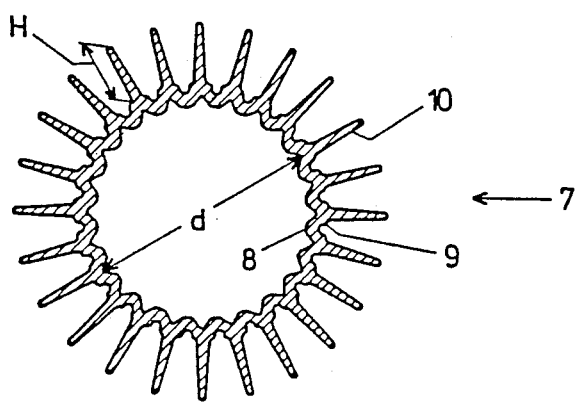
FIG. 2 is a cross section of an inner tube.

FIG. 2 illustrates a transverse cross section of an extruded inner tube 7 including an inner corrugated shell 8 corresponding in design to shell 2 of the outer tube 1. Outwardly extending fins 10 are integral with outward corrugation tops or projections 9. The distribution of the fins 19 corresponds to that of the fins of outer shell 2.

Figure 3:
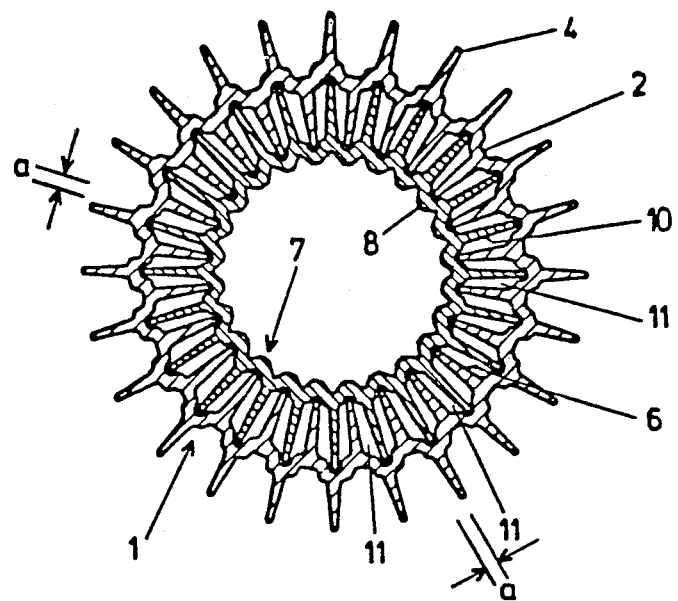
FIG. 3 is a cross section of cooler formed by joining of the tubes according to FIGS. 1 and 2 (section taken along line III—III of FIG. 6)

In the manufacture of a cooler, the thus formed extruded tubes 1 and 7 of equal length are assembled with the inner tube 7 substantially concentrically positioned within the outer tube 1. The height H of the fins 6, 10 measured in the radical direction is approximately equal to half the difference between the middle inner diameter D of the outer shell 2 and the middle outer diameter of the inner shell 8 so that the fins 6 as well as the fins 10 radially bridge a circumferential passageway formed between the assembled tubes (FIG. 3). The outer edges of the fins 6, 10 which bridge the mentioned circumferential passageway extend at the same time into slot-like recesses provided by the corrugations of the shells 2, 8, respectively, so that a division of the circumferential passageway into several chambers of equal size is achieved. Further, each fin 10 extending outwardly from the inner shell 8 bisects a partial passageway 11 formed between the limited by two adjacent fins 6 extending inwardly from the outer shell 2.

The width of these partial passageways 11 is very small, notice that FIG. 1 and the other figures illustrate the components on an enlarged scale. The actual parts are as a rule only half the size of those shown in the drawings. The bisected partial passageways 11 constitute a flow cross-section where its limiting walls, the fins 6 and 10, are positioned close to each other, being apart by a distance 'a' measured peripherally. This distance corresponds to a double boundary layer of the applied cooling medium. If the flow cross-section shown in FIG. 3 should be increased while maintaining the distance 'a' and the outer dimensions, then inner tube 7 will have a smaller inner diameter while increasing the height H of the fins 6 and 10. These dimension adaptions are of course possible only within a limited range, since on the one hand it is not possible to reduce arbitrarily the diameter of the inner tube 7 and on the other hand it is not possible to increase arbitrarily the height H of the fins 6 of the outer tube.

Figure 4:
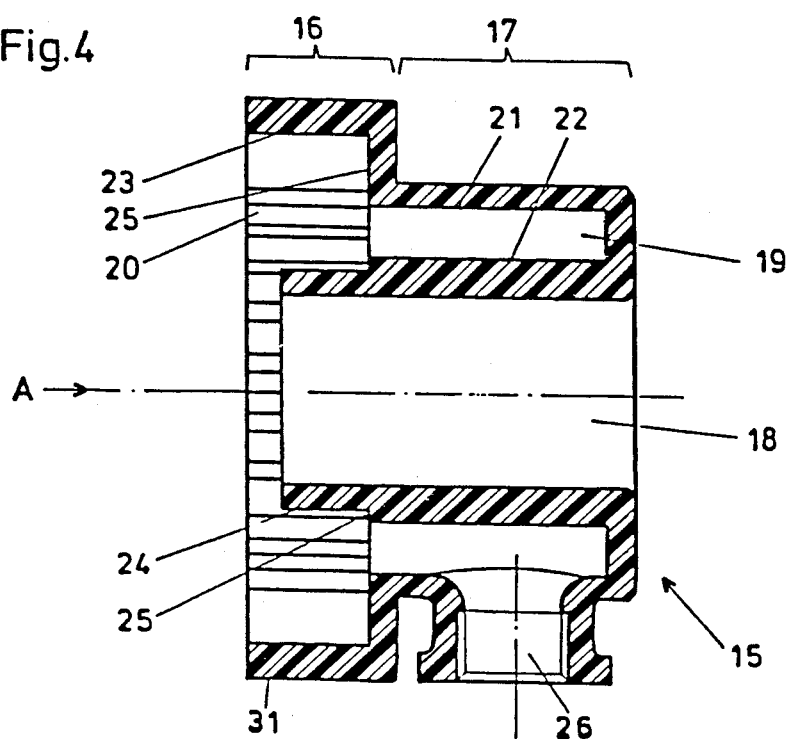
FIG. 4 is a longitudinal cross section of the front end closing cap.

The assembled, telescopically joined tubes 1 and 7 have closed frontal ends. A closing cap 15 shown in longitudinal cross section in FIG. 4 is employed for this purpose. The cap is divided in the axial direction into two sections 16 and 17 having different diameters and one central passage aperture 18. In the section 17 with a smaller diameter is situated an axially extending circumferential passage 19 which extends as shown in section 16 into an outwardly open circumferential passage 20.

While the passage 19 is defined by cylindrical walls 21 and 22, walls 23 and 24 of the second circumferential passage 20 are structured corresponding to the outer contour of the outer tube 1 and to the inner contour of the inner tube 7. This is shown in a front view of the closing cap in FIG. 5. The passages 19 and 20 extending into each other have a different radial extension and are situated in such a relation to each other than a shoulder 25 is formed in the transition area between the two passages 19 and 20. A connection flange 26 is provided on the side of the closing cap in section 17 and opens into passage 19.

The closing cap 15 is attached to the front ends of the telescopically joined tubes 1 and 7 so that the frontal side wall area of both tubes 1 and 7 extends into the circumferential passage 20 and is embedded in section 16. The front edges of both tubes 1 and 7 rest on the shoulder 25. The thus joined parts are glued together in this overlapped area. Due to the shown structured contour the glued area is very large. The closing cap is advantageously made of plastic material which, at least over a narrow range, exhibits a certain elasticity. This is an important feature when the cooler in operation is exposed to pressure impulses, since, because of the mentioned elasticity of the material applied in the closing cap, the circumferential passage 20 at least to a certain extent will then function as an expansion chamber and in this manner relieves the glued areas. Such pressure pulses have to be taken into account, e.g., when the cooler is installed in an oil circuit of an automatic transmission in a vehicle. Other materials possibly employed in the manufacture of the closing caps are metals, e.g. aluminum and its alloys.

Figure 6:
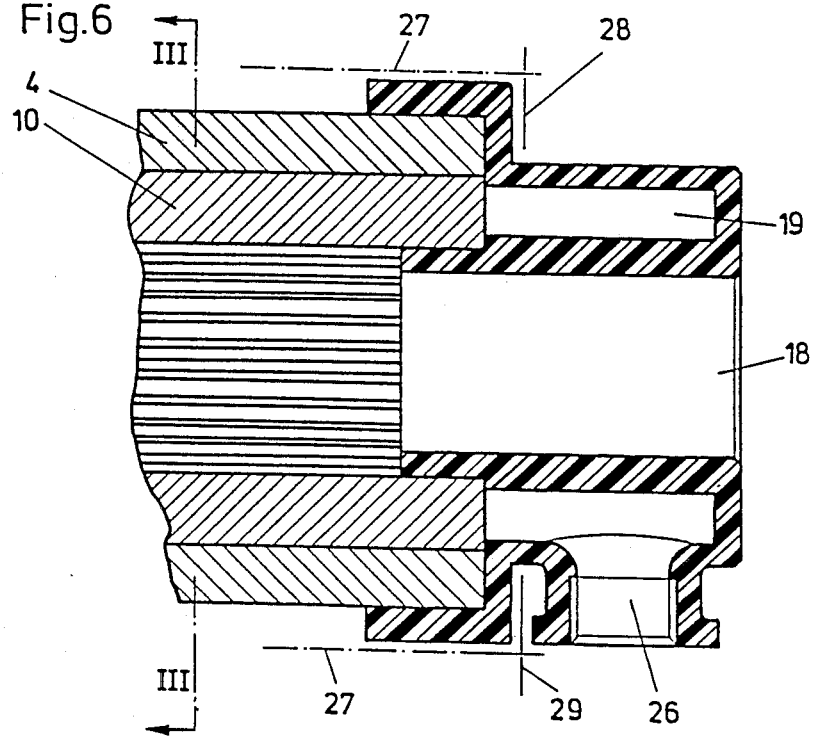
FIG. 6 is a longitudinal cross section through the cooler in the front area thereof.

Mechanical junctions instead of a glued connection between the tubes 1 and 7 and the cap 15 can also be employed, e.g. several draw (coupling) bars distributed along the perimeter and parallel to the axis of the cooler as suggested by the dotted lines 27 in FIG. 6. An outer shoulder 28 of the cap 15 is then provided with a circumferential fastening slot 29, suggested in FIG. 6 in a corresponding manner by a dotted line, in which the ends of the draw bars are fixed, e.g. by means of screws. Instead of connection flange 26 being integrally formed with the closing cap 15, the section 17 may alternatively be provided with a drilled aperture to accomodate a connection nipple.

Figure 5:
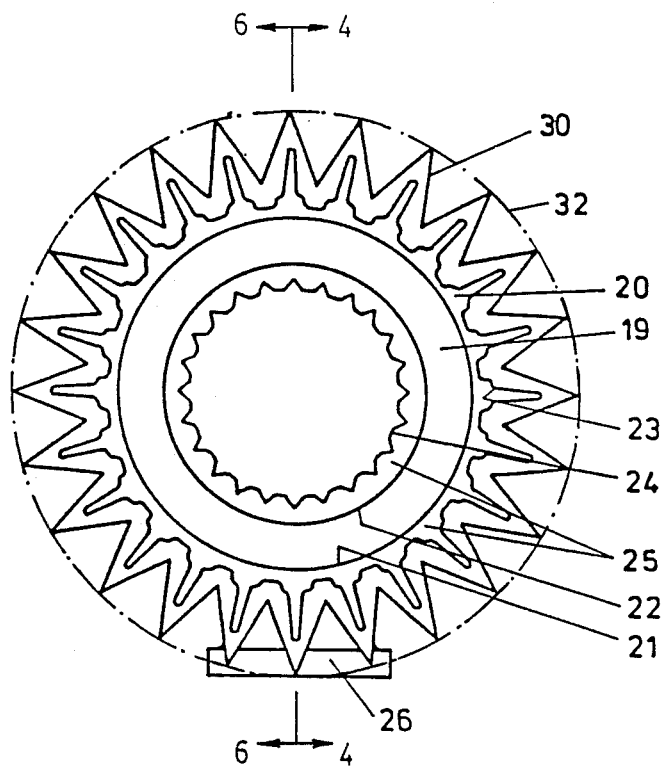
FIG. 5 is an end view of the closing cap according to FIG. 4 (viewed in direction of arrow A)

Advantageously, the surface of the section 16 of the closing cap 15 is also structured, and specifically in such a manner that by means of this structured contour toothlike steps 30 are provided (FIG. 5). A cooler of this type may be installed, e.g. in a tube, and steps 30 then have two functions, on the one hand to secure a correct positioning of the cooler in the tube, and furthermore to reduce the flow cross section formed between the cooler and the inner wall of the receiving tube available for passage of the cooling medium. Such a tube is illustrated by means of a dotted line 32 in FIG. 5.

In the illustrated embodiment the circumferentially closed outer and inner tubes 1 and 7 are formed as cylindrical tubes. However, other shapes (contours), e.g. elliptical or polygon, can be made within the scope of the invention. The closing cap 15 will then also be formed in a corresponding manner.

Furthermore, in the illustrated embodiment the outer contour of the outer tube 1 (FIG. 1) is formed circumferentially symmetric. Such a design is practical when the cooler is installed e.g., in a tube line. This is the case of oil coolers in vehicles where such an oil cooler is integrated with a water cooler (radiator). Within the scope of the present invention there is also a possibility to provide the outer tube 1 with an outwardly extending pad member or portion coextruded with the tube as a single piece as illustrated in FIG. 1 by a dotted line 14. Such a pad portion can be used for fastening or mounting of the cooler. If such a pad portion 14 is provided, then naturally also the outer limiting wall 23 of the second circumferential passage 20 of the closing cap 15 is formed in a corresponding manner.

By way of example, and without limiting the invention, some typical dimensions for such a cooler employed as an oil cooler in a vehicle are as follows.

The outer diameter of the outer tube 1 is approx. 40 mm and the outer diameter of the inner tube 7 is approx. 30 mm. The middle thickness S of the fins 4, 6 and 10 is approx. 0.6 mm and the wall thickness of the shells 2 and 8 is approx. 0.8 mm. FIG. 5 illustrates clearly how extremely advantageous is the ratio between the flow cross-section and the perimeter length of the flow path. The middle diameter of the shell 2 amounts approx. to 32 mm and the middle diameter of the inner shell 8 to approx. 22 mm. During the telescopic assembling of the tubes the corrugations engage each other in a tooth-like manner and by this tooth-like mutual engagement the tubes are fixed in relation to each other so that the outwardly extending fins of the inner shell are correctly situated in the passages formed between the inwardly extending fins of the outer shell and bisect these passages, and in this manner ensure identical geometrical conditions throughout the cooler. The width a of the passages 11 is optimally adapted to the actual cooling medium. The present proposed construction design makes it possible to provide elements to form the cooler where the middle width a of the passages 11 is only a few millimeters. These values correspond to double the boundary layer thickness of the cooling medium, and thus an optimal cooling capacity can be achieved.

It should be noticed that the fins 4, 6 and 10 may be formed with plane surfaces and sections, but it is also possible that the surfaces of the fins may be slightly corrugated. Finally, it should be mentioned that several oil coolers of the above described type can be connected and combined into groups.

Figure 7:
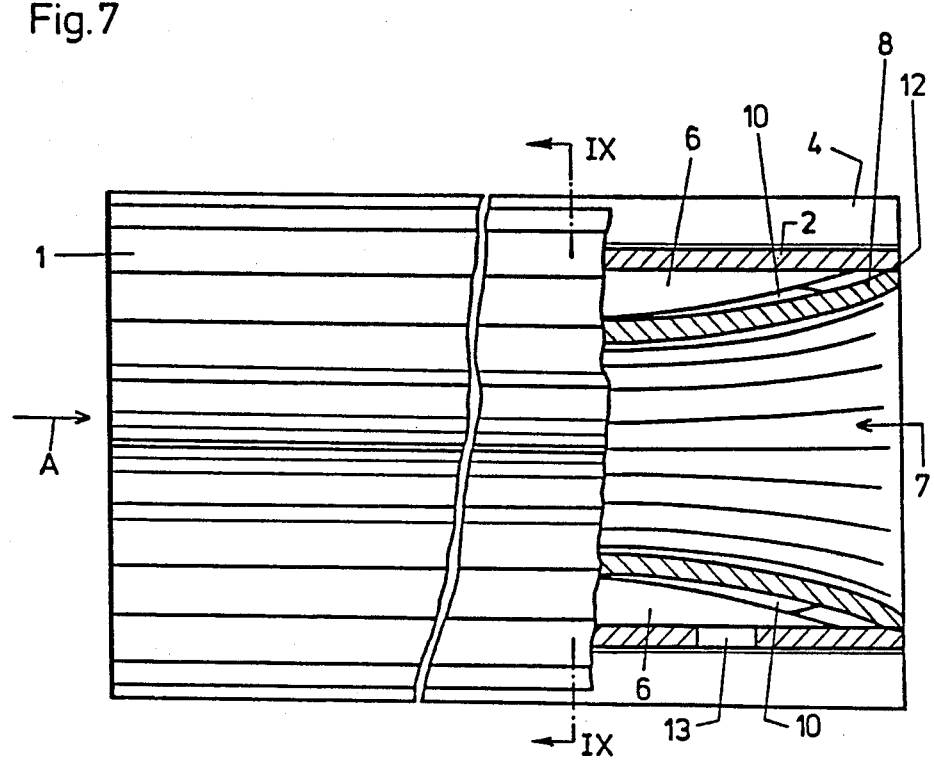
FIG. 7 is a side view of a second embodiment of the cooler, shown partly as a cross-sectional view.
Figure 8:
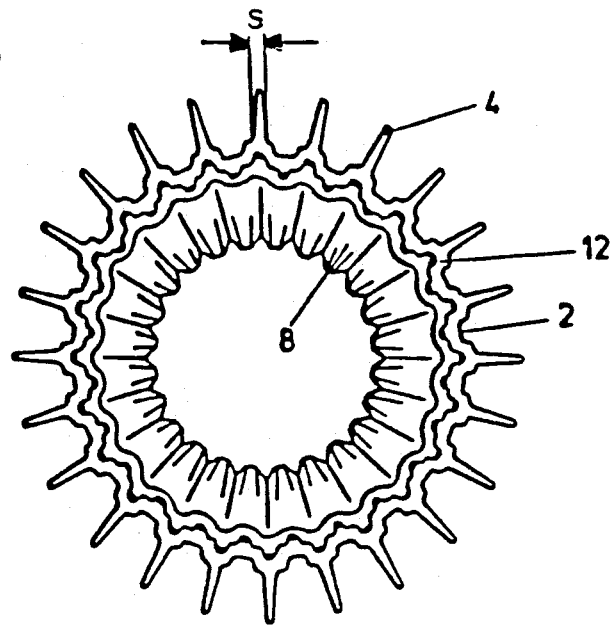
FIG. 8 is a front view of the cooler according to FIG. 7 (viewed in direction of arrow A)
Figure 9:
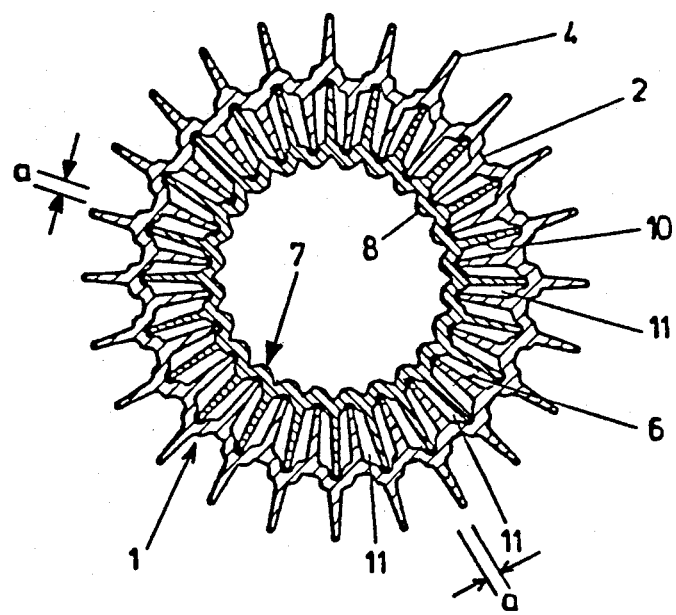
FIG. 9 is a cross section along line IX—IX of FIG. 7

A second embodiment of a cooler comprises the elements described above in detail in connection with FIGS. 1 and 2 is illustrated in FIGS. 7 to 9. The extruded tubes 1 and 2 having substantially equal length in this case also are joined telescopically. Before this joining operation the outwardly extending fins 10 are removed from the end part of the inner tube 7, and similarly the inwardly extending fins 6 are removed to the same extent from the outer tube 1. Thereafter the inner tube at such enc is conically enlarged to such an extent that the enlarged outer edge reposes on the inner side of the outer shell 2 (FIG. 7). In spite of the relatively thin wall of the shell 8 the enlargement is possible thanks to the special way of providing the extruded shapes. The corrugated shape of shell 8 constitutes a material depot uniformly distributed around the entire periphery of the shell, and such material can then be employed to accommodate the enlarging operation. Along a joining or connection line between the telescopically joined tubes 1 and 7, the tubes can be welded, soldered or glued together.

It is also possible instead of enlarging of the inner tube 7 to compress the outer tube 1, where also in this case the fins 6, 10 must be removed from the frontal end area. The corrugation of the shell 2 of the outer tube 1 is maintained also by such a controlled pressing operation.

FIG. 8 illustrates the front end of the cooler prepared for welding or soldering and showing the mentioned conical enlargement of the original shape of shell 8 of the inner tube 7. Close to the end area the outer shell 2 is provided with inlet and outlet apertures 13, which can be connected to a tube line or hose line by known and appropriate means.

In the illustrated embodiment the circumferentially closed outer and inner tubes 1 and 7 are formed cylindrically. However, other shapes, e.g. elliptical or polygon, are possible within the scope of the invention.

Taking into account the dimensions disclosed in the first embodiment applied in the embodiment according to FIGS. 7 to 9, it is obvious to what extreme extent the front end of the inner shell 8 is enlarged. The perimeter difference due to the enlargement $\Delta u = \pi(D-d)$ amounts to approx. 30 mm. Based on the original perimeter, this represents an enlargement of some 45%. Due to the special form of the shells 2, 8, it is possible to achieve a prolongation of this extreme range.

In the frontal end the inner shell is enlarged or the outer shell is compressed to such an extent that the corrugations still are maintained, but compared to the original form the extent of such corrugation is lessened or increased, respectively. During the telescopic assembling of the tubes the corrugations engage each other in a tooth-like manner, and by this tooth-like mutual engagement the tubes are fixed in relation to each other so that the outwardly extending fins of the inner shell are correctly situated in the passages formed between the inwardly extending fins of the outer shell and bisect these passages. In this manner identical geometrical conditions over the entire cooler body are ensured. The width a of the passages 11 is optimally adapted to the actual cooling medium. The present proposed construction design makes it possible to provide elements to form the cooler where the middle width a of the passages 11 represent only 0.2 mm, thus allowing optimal cooling capacity.

In the embodiment according to FIG. 7 the inlet and outlet apertures 13 for the cooling medium are situated in the outer shell 2. These apertures can also be arranged in the inner shell or in the inner and the outer shell without departing from the scope of the invention.

We claim:

1. A fluid cooler comprising:
   an extruded inner tube including an inner circumferentially closed shell having formed therein axially extending, circumferentially spaced corrugations defining inward and outward alternate projections and recesses, and axially extending heat exchange fins integral with and projecting radially outwardly from said outward projections;
   an extruded outer tube including an outer shell having formed therein axially extending circumferentially spaced corrugations of the same pattern as said corrugations in said inner shell and defining inward and outward alternate projections and recesses, and axially extending heat exchange fins integral with and projecting radially inwardly from said inward projections of said outer shell;
   said heat exchange fins of said inner and outer shells having radial heights substantially equal to half the difference between the inner diameter of said outer shell and the outer diameter of said inner shell;
   said inner tube being mounted concentrically within said outer tube to define therebetween a circumferential passageway, with said outwardly extending heat exchange fins of said inner shell extending across and dividing said passageway and fitting into respective of said inward recesses of said outer shell, and with said inwardly extending heat exchange fins of said outer shell extending across and dividing said passageway and fitting into respective of said outward recesses of said inner shell; and
   said outwardly extending heat exchange fins of said inner shell being removed from an end area of said inner tube, and the end of said inner shell at said end area being widened outwardly and joined to the adjacent end of said outer tube.

2. A fluid cooler as claimed in claim 1, wherein said corrugations in said inner shell are spread apart at said end area and engage in a tooth-like manner with said corrugations in said outer shell.

3. A fluid cooler as claimed in claim 1, wherein said outer tube further includes axially extending exchange fins integral with and projecting radially outwardly from said outward projections of said outer shell.

4. A fluid cooler comprising:
   an extruded inner tube including an inner circumferentially closed shell having formed therein axially extending circumferentially spaced corrugations defining inward and outward alternate projections and recesses, and axially extending heat exchange fins integral with and projecting radially outwardly from said outward projections;
   an extruded outer tube including an outer shell having formed therein axially extending, circumferentially spaced corrugations of the same pattern as said corrugations in said inner shell and defining inward and outward alternate projections and recesses, and axially extending heat exchange fins integral with and projecting radially inwardly from said inward projections of said outer shell;
   said heat exchange fins of said inner and outer shells having radially heights substantially equal to half the difference between the inner diameter of said outer shell and the outer diameter of said inner shell;
   said inner tube being mounted concentrically within said outer tube to define therebetween a circumferential passageway, with said outwardly extending heat exchange fins of said inner shell extending across and dividing said passageway and fitting into respective of said inward recesses of said outer shell, and with said inwardly extending heat exchange fins of said outer shell extending across and dividing said passageway and fitting into respective of said outward recesses of said inner shell; and
   said inwardly extending heat exchange fins of said outer shell being removed from an end area of said outer tube, and the end of said outer shell at said end area being narrowed inwardly and joined to the adjacent end of said inner tube.

5. A fluid cooler as claimed in claim 4, wherein said corrugations in said outer shell are compressed at said end area and engage in a tooth-like manner with said corrugations in said inner shell.

6. A fluid cooler as claimed in claim 4, wherein said outer tube further includes axially extending heat exchange fins integral with and projecting radially outwardly from said outward projections of said outer shell.

* * * * *